United States Patent [19]
Trbovich et al.

[11] Patent Number: 4,965,804
[45] Date of Patent: Oct. 23, 1990

[54] KEY MANAGEMENT FOR ENCRYPTED PACKET BASED NETWORKS

[75] Inventors: Nick G. Trbovich, Pembroke Pines; Thomas D. Campbell, Coral Springs, both of Fla.

[73] Assignee: Racal Data Communications Inc., Sunrise, Fla.

[21] Appl. No.: 305,672

[22] Filed: Feb. 3, 1989

[51] Int. Cl.$^5$ .............................................. H04L 9/00
[52] U.S. Cl. ........................................ 380/21; 380/45
[58] Field of Search .................................. 380/21, 45

[56] References Cited

U.S. PATENT DOCUMENTS 4,182,933  1/1980  Rosenblum .
4,578,531  3/1986  Everhart et al. .
4,607,137  8/1986  Jansen et al. .

OTHER PUBLICATIONS

The Cipher X 5000 Product Brochure and Technical Reference Manual.
The Dynapack Product Brochure.

Primary Examiner—Thomas H. Tarcza
Assistant Examiner—David Cain
Attorney, Agent, or Firm—Jerry A. Miller

[57] ABSTRACT

In a packet based communication network 10, a key management center 20 is used to distribute cryptographic keys for either a switched virtual circuit or a permanent virtual circuit. The disclosed methods allow the key management center 20 to communicate directly with the data encryption/decryption devices (DE's) 14 even though they operate in a transparent mode (rather than a store and forward mode). This is accomplished by balancing link counters with calls to fictitious addresses and/or use of interrupt packets transferred between the DTE 12 and the DE 14. In permanent virtual circuits, the MAC of the last packet transmitted under the cold cryptographic key is exchanged to synchronize the key change.

11 Claims, 5 Drawing Sheets

KEY MANAGEMENT FOR ENCRYPTED PACKET BASED NETWORKS

BACKGROUND

1. Field of the Invention

This invention relates generally to the field of data encryption and decryption as well as a technique which may be generally applicable to providing network services. More particularly the present invention relates to a method and apparatus for providing end-to-end data encryption and key management for X.25 and similar packet switching networks while maintaining proper packet numbering.

2. Background of the Invention

Due to attractive costs, capacity and other advantages, many data communications users are migrating to packet switched networks for some applications rather than using the current alternatives. However, many users are unable to take advantage of such networks due to their poor data security. As more and more data communication traffic is passed through such packet based networks such as X.25 networks, there becomes a greater need to provide data security between users of such networks. However, high levels of data security are inherently more difficult to provide in such networks while retaining full use of the network's advantages. While link level encryption is easily provided, this solution does not provide the high level of security required in many applications since clear data is available to an intruder at any number of locations in such a system. Accordingly, it is desirable to provide a mechanism for providing end-to-end encryption for packet based networks.

As with most encrypted communication systems, among the most difficult task of maintaining the security of such a network is that of key management. Since the security of the system depends heavily on the integrity of the key management system, the key management system must be secure and as easy as possible to use. It has long been known that the more frequently keys are changed the more secure the system. Since key changes are the responsibility of the key management system, the ultimate security of the system rests squarely upon both the integrity of the key management system and the ease with which keys may be changed. A cumbersome key management system may therefore result in less frequent key changes and an ultimate breech of security, or at best added expense.

The key management center has been proposed in the past as a solution to key distribution problems in non-packet systems. For example, U.S. Pat. No. 4,182,933 to Rosenblum describes such a system for providing remote key setting for an analog communication system. U.S. Pat. No. 4,578,531 to Everhart et al. also describes a key management system using a key distribution center coupled to the other encrypted devices by a special secure channel for transmitting keys. U.S. Pat. No. 4,607,137 to Jansen et al. describes another key distribution method.

Use of a key management system in a packet based network such as an X.25 type packet switching network basically involves obtaining a key from the key management center. In a switched virtual circuit, this presents special problems in call setup due to the need for the network to keep track (usually by packet numbers) of all packets involved in the setup and communication process. Both parties require the key(s) before actual communication can begin. Thus, the key management center must be involved in the call setup process. Since X.25 was not designed to provide for this, the network must be tricked into thinking that the packets counters are balanced in order to avoid problems. The present invention provides for maintaining the proper counter values for tracking packet numbers while maintaining X.25 compatibility.

The Cipher X TM series of encryption devices from Technical Communications Corporation provides end-to-end encryption for packet based networks, however no key management center is used for key management. Also, this device is incapable of supporting fast select packets, datagrams, packets with extended sequence numbers, invalid packet types, call requests with invalid cipher parameters, permanent virtual circuit packets, and call requests while the maximum number of virtual circuits are active.

The use of calls to a fictitious SAPI address is disclosed in U.S. patent application Ser. No. 150,130 to Norman Donaghue et al. filed Jan. 20, 1988. In this application, the fictitious calls are used to facilitate ISDN passive bus communication. This application is owned by the assignee of the present invention.

The present invention provides a method and apparatus for providing key distribution through a key distribution center for packet based networks such as X.25 networks. The present invention conforms to the current X.25 and X.9.17 standards while requiring no dedicated secure channel for transmission of keys.

SUMMARY OF THE INVENTION

It is an object of the present invention to provide an improved key management system for packet based networks.

It is another object of the present invention to provide end-to-end encryption in a packet based network.

It is another object of the present invention to provide a key management center for a packet based network which maintains proper packet counter balances within the network.

It is another object of the present invention to provide end-to-end encryption in a packet based network without use of store and forward techniques.

It is another object of this invention to provide for key management in packet based systems using both permanent virtual circuits and switched virtual circuits.

It is a further object of the present invention to provide a key exchange mechanism which is transparent to the packet based network and requires no modification to the standard operation of such packet based networks (e.g. X.25 networks).

It is an advantage of the present invention that link encryption is avoided thus reducing the number of encryption devices required and thus the cost of providing secure communication.

These and other objects of the invention will become apparent to those skilled in the art upon consideration of the following description of the invention.

According to one aspect of the present invention, a method of providing communication between a normally transparent device and a network service provider in a packet switched network, includes the steps of: transmitting a call from a source DTE destined for a target DTE; at the transparent device, intercepting the call from the source DTE to the target DTE and transmitting a call from the transparent device to the network service provider in place of the call from the source DTE; receiving a response from the network service provider at the transparent device; and balancing traffic through the transparent device by transmitting a dummy packet from the transparent device to the source DTE.

Preferably, the network service provider includes a key management center, the transparent device includes a data encryption device, and the method further includes the step of transmitting a cryptographic key from the key management center to the data encryption device. A cryptographic key is then transmitted to the target DTE. The balancing step includes the steps of transmitting a call request packet for a fictitious address from the transparent device to the source DTE, transmitting a clear request packet from the source DTE to the transparent device and transmitting a clear confirmation packet from the transparent device to the source DTE. The intercepting step preferably includes the step of intercepting a call setup packet from the source DTE destined for the target DTE and substituting a fast select packet to the network service provider in its place.

In another aspect, a packet switched network coupled to a first DTE and a second DTE with first and a second transparent device coupled between the first and second DTE's and the packet switched network respectively, and a network service provider coupled to the packet switched network, a method for balancing traffic through the transparent device includes the steps of: transmitting a dummy message from the first transparent device to the first DTE; and responding with a response packet from the first DTE to the transparent device.

In another aspect of a packet switched network according to the present invention, a method for changing keys used for encrypted switched virtual circuit communication between a first DTE and second DTE, the first and second DTE having an associated first and second encryption device, includes the steps of: issuing a call request packet from the first DTE to the second DTE; intercepting the call request packet at the first encryption device and substituting a call request for a key management center; transferring a key from the key management center to the first DTE; balancing counters at a link associated with the first DTE and first encryption device using a dummy packet; establishing a channel between the first and second data encrypters; and transferring a key from the first data encrypter to the second encrypter.

In a further aspect of a packet switched network according to the present invention, a method for changing keys used for encrypted permanent virtual circuit communication between a first DTE and a second DTE, the first and second DTE having an associated first and second encryption device, includes the steps of: issuing a call request packet from a key management center to the first encryption device; issuing a call request packet from the key management center to the second encryption device; from the key management center, sending a stop packet flow message from the first DTE to the second DTE and obtaining a last MAC from the first data encryption device and transferring a new key to the first data encryption device; from the management center, sending a stop packet flow message from the key second DTE to the first DTE and obtaining a last MAC from the second data encryption device and transferring a new key to the first data encryption device; from the key management center, sending a restart packet flow message to restart packet flow between the first and second DTE; an balancing link counters at the first and second links by transmission of dummy packets.

The features of the invention believed to be novel are set forth with particularity in the appended claims. The invention itself however, both as to organization and method of operation, together with further objects and advantages thereof, may be best understood by reference to the following description taken in conjunction with the accompanying drawing.

DETAILED DESCRIPTION OF THE INVENTION

1. Glossary

Figure 1:
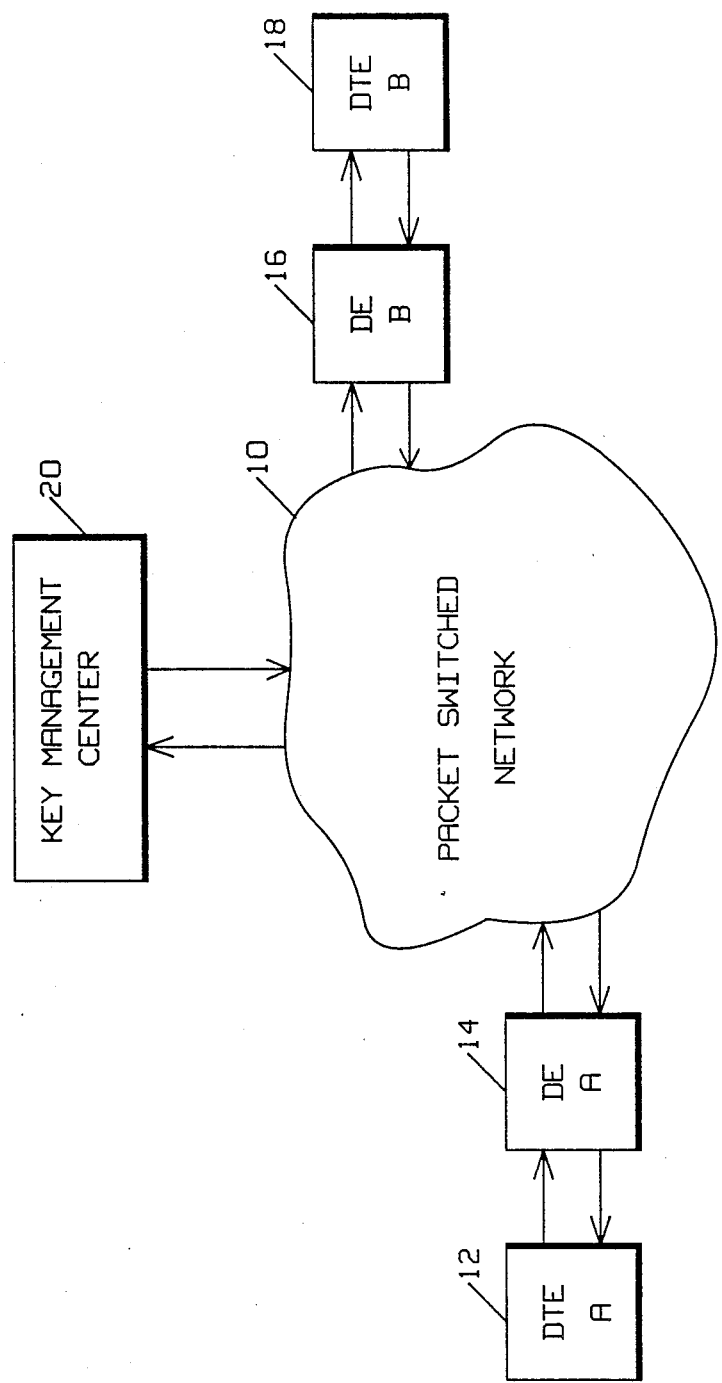
FIG. 1 is a diagram of an X.25 network utilizing the present invention.

The following terms and abbreviations are used freely throughout the description and drawings of this invention and are collected below for easy reference. Most terms are standard in the industry and are defined in various standards documents and the like or have meanings which are self evident in the context of packet communication, key management or cryptography.

ANSI American National Standards Institute.
CA Call Accept.
CC Call Confirmation.
CCITT Comite's Consultatif International de Te'le'graphique et Te'le'phonique.
CL CLear.
CLRQ CLear ReQuest.
CON CONfirmation.
CRC Cyclic Redundancy Check.
CRP Call Request Packet.
DCE Data Circuit Equipment.
DE Data Encrypter/decrypter.
DISC DISConnect.
DTE Data Terminal Equipment. (e.g. PAD, computer, terminal, etc.)
ESM Error Service Message
ERS Error Recovery Service message.
FS Fast Select.
HDLC High level Data Link Control.
INT INTerrupt.
ISO International Standards Organization.
IV Initialization Vector.
KD Data encrypting Key.
KK Key encrypting Key.
*KK Key used for communication with Key management center.
KMC Key Management Center.
KSM Key Service Message
LAPB Link Access Protocol B.
MAC Message Authentication Code.
OSI Open Systems Interconnection.
PAD Packet Assembler/Disassembler.

PVC Permanent Virtual Circuit.
RFS Request For Service message.
RNR Receiver Not Ready.
RSM Response Service Message
RTR Response To Request message.
RR Receiver Ready.
SABM Set Asynchronous Balance Mode.
SAPI Service Access Point Identifier.
SDNS Secure Data Network System.
SVC Switched Virtual Circuit.
VC Virtual Circuit.

It should be noted that althoug encryption/decryption devices are normally transparent to the devices coupled to them, the present devices are only 'semi-transparent' in that messages may eminate from them or be directed to them. However, references in this document to transparent devices are intended to embrace this semi-transparent mode of operation to be described. It is also noted that the terms DE, encrypter, encryption device, encryption/decryption device, etc. are intended to embrace devices which may be capable of both encryption and decryption functions in general, but are not limited to devices with both functions.

Both of the methods described below utilize a technique for call and counter balancing in which a set of 'dummy' packets are exchanged between the transparent device (DE in the preferred embodiment) and the DTE. This technique in particular uses an interrupt request/interrupt confirmation sequence in one case and calls and responses to a fictitious address in another. In the interrupt version, two packets are exchanged and in the fictitious call version three packets are exchanged. Both of these techniques result in an essentially meaningless exchange between the DE and the DTE which serves to keep all counters balanced while affording the DE an opportunity to carry out a meaningful exchange with the KMC or another DE within the constraints of the network. In general, an interrupt sequence can be used if a call is already established, and a fictitious call can be used if no call has been established. In some instances it may be possible to use either (for example, if a long enough time delay is used to assure a connection, an interrupt can sometimes substitute for a fictitious call). In some systems, it may be possible to use a SABM (Set Asynchronous Balance Mode) packet to accomplish the same function, depending upon the Layer 3 response to such packets. Other networks may provide a No Operation packet which may be used for similar purpose by those skilled in the art. All such packets which are suitable for such uses fall within the present invention and are thus properly referred to as 'dummy packets'. Of course, for the fictitious call technique, there should exist an unused address in the network.

2. System Overview

Turning now to FIG. 1, an X.25 packet switched network is shown using the present invention. In this figure, the packet switching network (PSN) is shown generally as 10 and includes the DCE equipment (not explicitly shown) necessary for interfacing as well as an arrangement of nodes, links, switches, etc. as required to define the network. In the present example, DTE-A which is designated 12 is connected through a data encryption/decryption device DE-A 14 to the network 10. Also coupled to the network 10 through a DE-B designated 16 is a DTE-B which is designated 18. In accordance with the present invention, a key management center (KMC) 20 is also connected to the PSN 10. The DTE's 12 and 18 may be considered to include a packet assembler/disassembler (PAD) if needed.

For purposes of example only, and not by way of a limitation, the packet switched network 10 may be considered to be a network conforming to CCITT recommendation X.25. The present invention is applicable to other types of packet based networks whifch are not in strict conformance with X.25 and with similar networks with suitable modifications. The present invention also may be used, with two variations, to provide end-to-end encryption and key management for both switched virtual circuits (SVC) and permanent virtual circuits (PVC) in a transparent manner without use of store and forward techniques with their associated problems. Those skilled in the art will also appreciate that the present invention may be utilized to provide other network services besides key transfer types of services with suitable modification.

Before beginning a detailed explanation of the operation of the present invention, consider the following general overview of the high level functionality for DE's that represent the two variations or approaches to end-to-end encryption of the present invention in an X.25 environment. The DE's in general are located on the X.25 lines between the PAD's or network access processors (the DTE's of FIG. 1) and the DCE's which are a part of the packet switched network 10. As is generally known, X.25 packets contain fields of data and header fields. The information fields of data packets are decrypted in the inbound direction and encrypted in the outbound direction with reference to the DTE, leaving the header fields clear (unencrypted). Routing and flow control can be performed by the PSN without doing any additional cryptographic operations since the headers are unencrypted.

According to the present invention the DE's operate in a network transparent mode without use of store and forward techniques. Incoming data packets are transmitted before the entire packet has arrived. Only enough bits are delayed for the DE device to determine which cryptographic key to use. Extremely low delays result; less than ten milliseconds per packet on a 9600 bps link. Flow control for this invention is achieved by modifying the DTE side clocks rather than by the use of control packets. The DE's do not maintain ISO level 2 or 3 state variables and consequently do not require SDNS capabilities.

The present invention operates in conjunction with and under the control of the key management center 20. The key management center 20 is a network access processor to X.25 which distributes keys, collects and logs errors, and provides a source of closed user group information for the network of encrypters.

3. Detailed Operation

Figure 2:
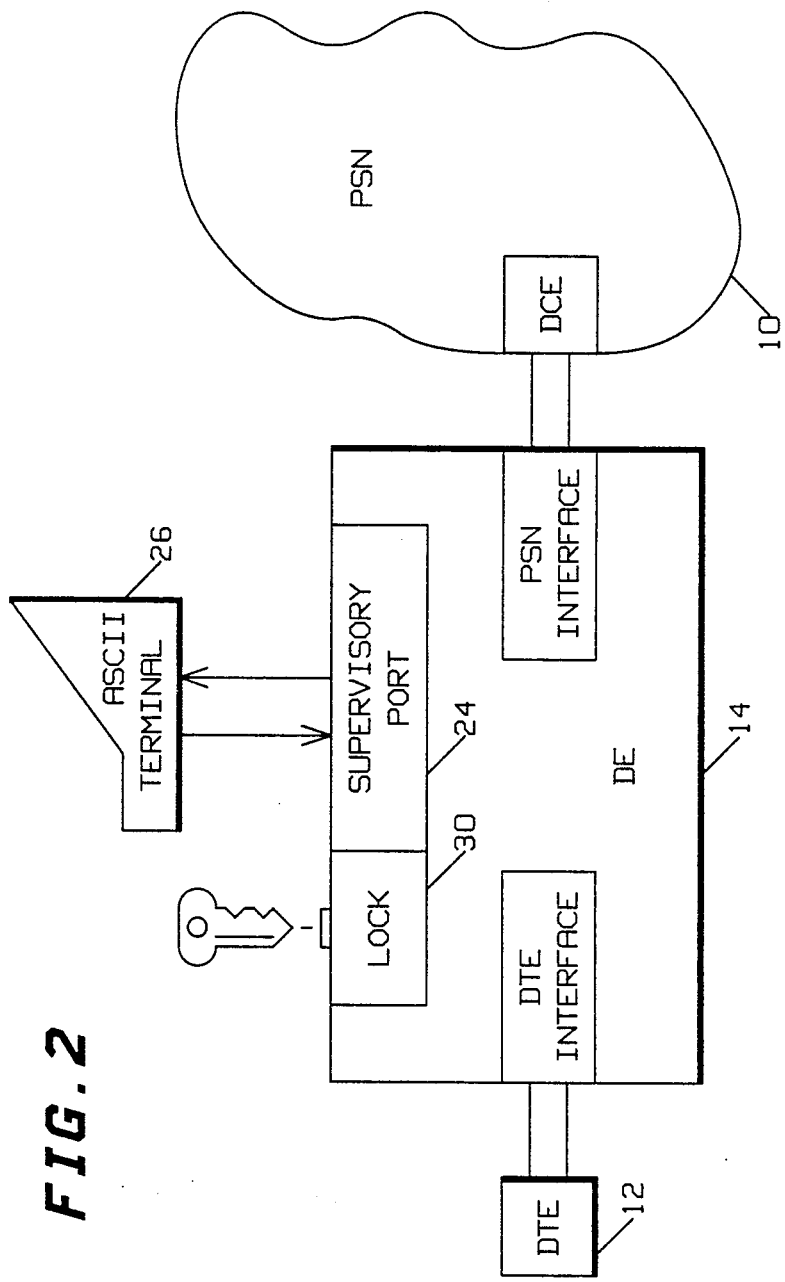
FIG. 2 is a diagram showing a portion of a data encrypter/decrypter according to the present invention.

Turning briefly to FIG. 2, initialization of the DE's is described. In this figure DE 14 is shown by way of example, but both DE 14 and DE 16 preferably operate identically or similarly. Initialization may be accomplished via a supervisory port 24 in the preferred embodiment, such as an RS232 port. This port is used for establishing and modifying a set of initialization parameters using, for example, a "dumb" ASCII terminal 26. Access to the supervisory port should preferably be protected by physical (e.g. key or combination) locks 30 and by password protection in a known manner to assure security. The password is thus modifiable only when the physical locks 30 are opened. All other parameters are modifiable only after issuing the correct password. A password prompt may be sent to the screen, for example, when CNTL-C is entered. After a predetermined amount of time has elapsed without any information being entered, the DE returns to the enter password mode and the password must be entered again before any parameters can be entered or modified in the preferred embodiment.

The following is a set of parameters which can be set in order to initialize the system: password, link parameters, X9.17 unit identification, key management center address, master key (The *kk used to communicate with the key management center.), PVC's (The logical channel numbers of the permanent virtual circuits assigned to this unit.), address formats (The method used to encode the addresses, i.e., PAD.PORT-NUMBER.), cleartext VC's (The destination addresses or logical channel numbers of those destination devices which will operate in the clear.), X.25 timeout values and random number seed (The random number generator is used to establish encryption keys and first time IV's. Subsequent IV's will be taken from the MAC computed on the previous packet.).

The key management strategy of the present invention has an objective of functionally implementing the ANSI X9.17 standard in packet networks such as X.25 networks in a transparent end-to-end encryption environment. This objective is of course aimed at providing greater security than the traditional link encryption environment. X9.17 specifies essentially three distinct key management strategies, namely, key translation, key distribution, and point-to-point transfer. Since point-to-point transfer is not consistent with a centralized key management center and, it is impractical to provide a new key per SVC (session keys) in a distribution environment for SVC's, it was determined that a translation environment is the most suitable for switched virtual circuits and either a distribution or translation environment is more suitable for permanent virtual circuits.

There are two types of data packets to be encrypted within an X.25 network: those associated with switched virtual circuits and those associated with permanent virtual circuits. The present key management methods provide a mechanism to exchange key information in both of these circuit environments. The implementation of the present key management strategy for each of these types of circuits require somewhat different techniques. For example, switched virtual circuits have call set-up procedures associated with them which allow the DE's to exchange KK and KD information at call set-up time. On the other hand, permanent virtual circuits do not have call set-up procedures since data packets may be continually flowing. This makes key exchanges more difficult since the key exchange must be synchronized.

Figure 3:
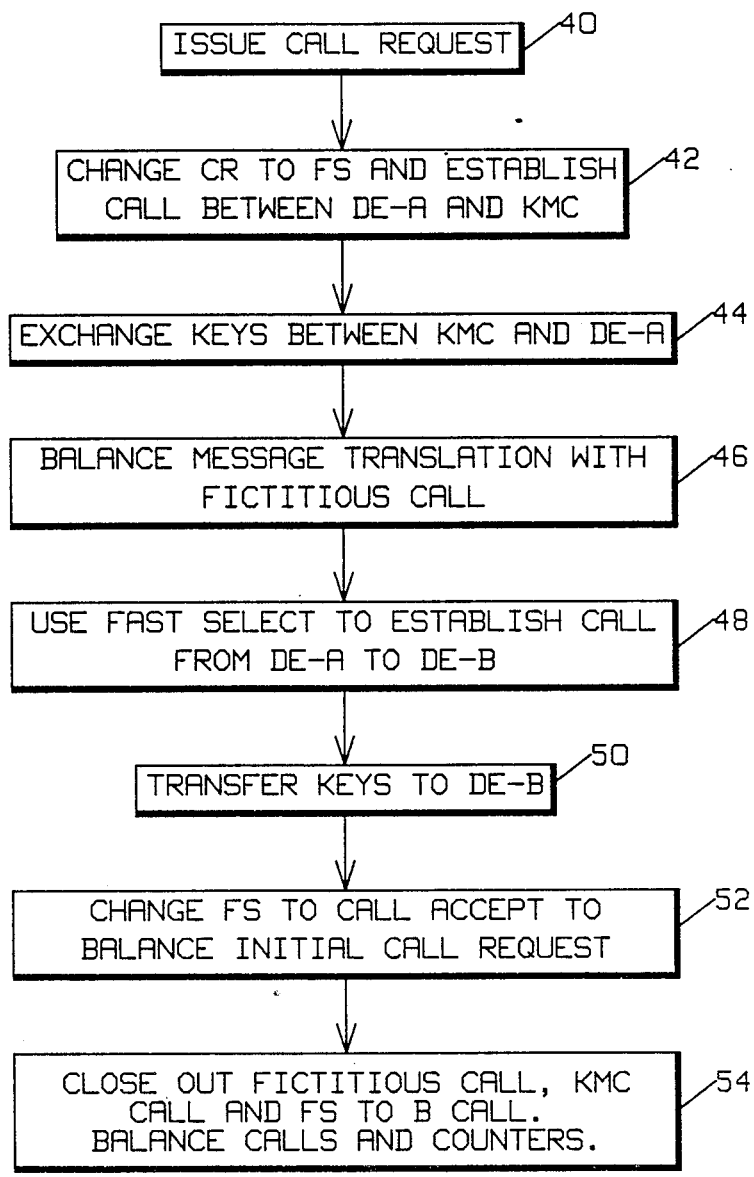
FIG. 3 shows a flow chart of the present invention's operation in a switched virtual circuit.

In the case of the present invention for SVC's, a user initiated call set-up procedure is performed prior to the exchange of any data packets. The X.25 packets which are used for this purpose can also be used to exchange KK and KD information. Turning now to FIG. 3, the following describes a procedure which exchanges KK and KD information, as specified by the ANSI X9.17 key management standard under key translation procedures, between a key management center and two end-to-end data encrypter/decrypters using switched virtual circuits to transfer data.

In avoiding the store and forward approach, a number of problems occur concerning the transfer of data between a data encrypter/decrypter and the KMC or another data encrypter. These problems relate to maintaining the correct level 2 (HDLC LAPB) and level 3 frame counters between a DTE and a DCE while also generating and receiving packets at a DE. For example, under ANSI X9.17 key translation, when DTE-A wishes to change a KK with DTE-B, DTE-A must first go to the KMC to get the KK translated and then transfer this KK to DTE-B. This requires a DE to connect an SVC between itself and the KMC. In the present implementation of key translation for SVCs, KK's are exchanged only at call set-up time, hence a call set-up and KK/KD exchange for two DTE's wishing to establish an encrypted call is defined. By way of example, let DTE-A be the originator of a call and DTE-B be the recipient of the call. Let DE-A and DE-B be the data encrypter/decrypters associated with DTE-A and DTE-B, respectively. When DTE-A issues a call request packet CRP to DTE-B, DE-A will check to see if a KK needs to be exchanged between itself and DE-B.

The following cases specify when or when not DE-A will request a KK and KD from the KMC. In one case it has been determined that encryption is required and a KK has been already established. Thus a KK exchange will not be necessary unless the KK's crypto-period has expired. In another case it has been determined that encryption will not be established, hence no KK exchange is necessary. In a third case it has not been determined if an encryption relationship has been established. In this case DE-A will ask the KMC if there is any encryption established and if so the KMC will reply with KK and KD information.

(a) SWITCHED VIRTUAL CIRCUITS

A detailed 35 step procedure representing the message flow for the present invention used with a SVC is detailed in the following Table 1. In all cases, the DCE is that of the network.

TABLE 1

| | | | SWITCHED VIRTUAL CIRCUITS |
|---|---|---|---|
| STEP | FROM | TO | MESSAGE |
| 1 | DTE-A | DE-A | CALL REQUEST FOR B |
| 2 | DE-A | DCE | FAST SELECT (RFS) FOR KMC |
| 3 | DCE | KMC | FAST SELECT (RFS) FOR KMC |
| 4 | KMC | DCE | FAST SELECT CALL ACCEPT (RTR) |
| 5 | DCE | DE-A | FAST SELECT CALL ACCEPT (RTR) |
| 6 | DE-A | DTE-A | FICTITIOUS CALL REQUEST #1 |
| 7 | DTE-A | DE-A | CLEAR FICT. CALL REQUEST #1 |
| 8 | DE-A | DCE | FAST SELECT (KSM) FOR B |
| 9 | DCE | DE-B | FAST SELECT (KSM) FOR B |
| 10 | DE-B | DTE-B | CALL REQUEST FOR B |
| 11 | DTE-B | DE-B | CALL ACCEPT |
| 12 | DE-B | DCE | FAST SELECT CALL ACCEPT (RSM) |

TABLE 1-continued

| | | | SWITCHED VIRTUAL CIRCUITS |
|---|---|---|---|
| STEP | FROM | TO | MESSAGE |
| 13 | DCE | DE-A | FAST SELECT CALL ACCEPT (RSM) |
| 14 | DE-A | DTE-A | CALL ACCEPT |
| 15 | KMC | DCE | DATA PACKET (POLL) |
| 16 | DCE | DE-A | DATA PACKET (POLL) |
| 17 | DE-A | DTE-A | FICTITIOUS CALL REQUEST #2 |
| 18 | DTE-A | DE-A | CLEAR FICT. CALL REQUEST #2 |
| 19 | DE-A | DCE | DATA PACKET (RSM OR STATUS) |
| 20 | DCE | KMC | DATA PACKET (RSM OR STATUS) |
| 21 | KMC | DCE | DATA PACKET (CLEAR CONFIRMATION) FOR STEP 18 |
| 22 | DCE | DE-A | DATA PACKET (CLEAR CONFIRMATION) FOR STEP 18 |
| 23 | DE-A | DTE-A | CLEAR CONFIRMATION FOR STEP 18 |
| REPEAT STEPS 15 THRU 23 AS LONG AS STEPS 19 AND 20 DO NOT CONTAIN AN RSM MESSAGE | | | |
| 24 | KMC | DCE | DATA PACKET (CLEAR CONFIRMATION) FOR STEP 7 |
| 25 | DCE | DE-A | DATA PACKET (CLEAR CONFIRMATION) FOR STEP 7 |
| 26 | DE-A | DTE-A | CLEAR CONFIRMATION FOR STEP 7 |
| 27 | KMC | DCE | DATA PACKET (CLEAR CALL) FOR STEPS 2-5 |
| 28 | DCE | DE-A | DATA PACKET (CLEAR CALL) FOR STEPS 2-5 |
| 29 | DE-A | DTE | FICTITIOUS CALL REQUEST #3 |
| 30 | DTE-A | DE-A | CLEAR FICT. CALL REQUEST #3 |
| 31 | DE-A | DCE | CLEAR REQUEST FOR STEPS 2-5 |
| 32 | DCE | KMC | CLEAR REQUEST FOR STEPS 2-5 |
| 33 | KMC | DCE | CLEAR CONFIRMATION FOR STEP 32 |
| 34 | DCE | DE-A | CLEAR CONFIRMATION FOR STEP 31 |
| 35 | DE-A | DTE-A | CLEAR CONFIRMATION FOR STEP 30 |

The present invention uses a different master key from the key management center ($*KK_{AB}$) for every pair of encrypters. The encrypters themselves generate the session keys and use a new session key for each session. There is a high level key $*KK$ for each DE, e.g. $*KK_A$, which is used for DE to KMC communication. This key is manually distributed in a conventional manner and should be periodically changed for enhanced security. Of course, modifications can be made to this scheme without departing from the present invention.

The present key exchange process begins at step 1 where DTE-A issues a call request packet in order to initiate a call with DTE-B. At step 2, DE-A checks to see if it has a key for communication with DE-B. If not, or if a time period has elapsed since the key was last changed, the CALL REQUEST packet is converted by the DE-A to a FAST SELECT RFS packet to call the KMC. The FS packet is used because of the short handshake used to establish the link, and because data can be sent in the FAST SELECT packet itself. Per X9.17 requirements, an RFS (request for service) is part of the FS along with a message which in essence says that a key for A to B communication is needed.

The KMC responds with a FAST SELECT CALL ACCEPTED (FS CA) packet containing an ANSI X9.17 RTR or ESM crypto-service message at steps 4 and 5. This message includes $KK_{AB}$(the new key for A to B communication) encrypted under both keys used for KMC communication with DE-A and DE-B. This message might be designated in common cryptographic terms as follows:

$$E*_{KK-A}(KK_{AB}) + E*_{KK-B}(KK_{AB})$$

where + designates concatenation.

After DE-A receives this message, DE-A changes this message into a CRP to a fictitious address at the DTE-A at step 6. This is done to keep the layer 2 packet counter at DTE-A in balance. DTE-A responds with a CLEAR REQUEST at step 7 in accordance with X.25 requirements. At step 8, DE-A changes the CLEAR REQUEST to a FAST SELECT CRP with the same address the original call specified, namely DTE-B. DE-A also puts an ANSI X9.17 KSM crypto-service message into the FAST SELECT user data field as follows:

$$E_{KK_{AB}}(DK) + E*_{KK-B}(KK_{AB}).$$

This message is forwarded by the network at step 9. At DE-B the KSM information is removed and the FS CRP is converted to a CRP for DTE-B and the keys are installed at DE-B at step 10. At step 11, DTE-B either responds with a CALL ACCEPTED or a CLEAR REQUEST packet. In either case, the DE-B changes this packet into its FAST SELECT version and inserts an ANSI X9.17 RSM or ESM crypto-service message into the packet at step 12. This message is forwarded by the network in step 13. At step 14, DE-A converts the FS packet to a CALL ACCEPT to balance the original step 1 call request. Of course, there now exists an imbalance due to no response to the clear request in step 7 and there is an open call between the KMC and DE-A.

At step 15, the KMC polls DE-A to determine if the key exchange operation is completed since there has not been a response to the RTR per X9.17. This poll is forwarded at step 16. At step 17, DE-A converts this poll to a fictitious call request. A clear request at step 18 is generated in response, and it allows the DE-A to answer the poll from the KMC with the required RSM at step 19 which is forwarded at step 20. If the call accept message of step 13 has not been received by DE-A by this time, then the message sent in steps 19 and 20 will be status rather than RSM. A data packet is sent from the KMC to the DE-A in steps 21 and 22 that allows DE-A to forward a clear confirmation to DTE-A, balancing the outstanding clear request of step 18. Polling is continued until the KMC receives an RSM response to the poll; this polling consists of repeating steps 15 thru 23.

At step 24, the KMC sends a DATA packet (which is relayed at step 25) to DE-A which is changed into a CLEAR CONFIRMATION packet for DTE-A at step 26. This closes the outstanding fictitious call. The KMC then sends a final DATA packet at step 27 to DE-A.

This packet is relayed at step 28 and changed into another CRP to a fictitious address at step 29. DTE-A then responds at step 30 with a CLEAR REQUEST packet to balance the link A counter. This packet is sent to the KMC via steps 31 and 32, thus clearing the pseudo-call between the KMC and DE-A.

The last transaction is for the KMC to send the CLEAR CONFIRMATION packet at steps 33 and 34 to DE-A which then is passed to DTE-A at step 35, closing all outstanding calls.

If an error occurs anywhere in the above procedure, an error such as a lost packet (timeout) or a MAC failure, the procedure is aborted and the KMC notified of this fact. Since the KMC always expects a closure (error or not) the KMC is always aware of the status of the KK exchange. In the present key translation scheme, KD's are exchanged each time a virtual circuit is established. The method in which this is done is identical with the transmission for KK's between one DE and another and is described here for the sake of completeness.

The general idea of the present invention is shown in FIG. 3. DE-A changes the first CALL REQUEST packet (CRP) a user issues at 40 to DTE-B to a FAST SELECT CRP to the KMC containing an ANSI X9.17 RFS crypto-service message at 42. At 44, the keys are exchanged with the KMC. The fast select translation at 42 is balanced with a fictitious call at 46 to maintain proper message and counter balance. A call is then established with B at 48 using a fast select call request and keys are exchanged with DE-B at 50. The fast select is changed to a call accept at 52 to respond to the initial call request. At 54, the remaining fictitious call, call to KMC and FS to B are closed out using a fictitious calls to balance the various counters and messages.

Using the above method, the KMC is able to effectively communicate with a device which normally is transparent to the network. Thus, the DE's could more properly be called pseudo-transparent since normally they appear transparent to the network, but using the above protocol can directly interface with the KMC as if it were a DTE type device or the like. This communication is effected by using the above translations of packets to maintain proper counter and message balance. This effectively deceives the DTE and the network into allowing communication with the DE. The terminology "transparent" in connection with such devices will be retained but is understood to encompass devices which are more properly "semi-transparent". Those skilled in the art will appreciate that similar techniques may be used to provide for other network services such as diagnostic and network management functions. Other uses will occur to those skilled in the art.

(b) PERMANENT VIRTUAL CIRCUITS

The key exchange in a PVC environment is somewhat more difficult in many ways than with SVC's due the problem of synchronizing the key exchange. The problem stems from the fact that the key exchange may have to occur while data packets are flowing between the two end devices, whereas, with SVC's the keys are exchanged before data transfer has begun. To overcome this problem, the present key management strategy uses key distribution with each DE computing and saving the MAC associated with the last inbound and outbound messages on each PVC it has.

Prior to a key exchange, the data encrypters shut down the PVC in question via level 3 flow control and exchange their last outbound MAC's. The data encrypters then restart the target PVC and encrypt all outbound data packets with the new key. When a data encrypter receives an inbound data packet with a match between the data packet's MAC and the other encrypter's last outbound MAC, the data encrypter then starts to use the new key as a decrypt key. This enables each data encrypter/decrypter to know when to start decrypting under the new key.

In this embodiment, key distribution techniques are used wherein the KMC has control over the key exchanges. This invention also assumes initial distribution of keys *KK by manual means or the like. Key changes may either be manually triggered at the KMC or may be based upon time intervals or similar schemes as desired.

Table 2 describes the permanent virtual circuit embodiment of the present invention. In this table, the DCE's (Network) relaying of packets, as shown in more detail in connection with Table 1, has been omitted.

TABLE 2

| STEP | PERMANENT VIRTUAL CIRCUIT | | |
|---|---|---|---|
| | FROM | TO | MESSAGE |
| 1 | KMC | DE-A | FAST SELECT A (RTR) |
| 2 | DE-A | DTE-A | INTERRUPT |
| 3 | DTE-A | DE-A | INTERRUPT CONFIRMATION |
| 4 | DE-A | KMC | CALL ACCEPT (RSM) |
| 5 | KMC | DE-B | CALL REQUEST B |
| 6 | DE-B | DTE-B | INTERRUPT |
| 7 | DTE-B | DE-B | INTERRUPT CONFIRMATION |
| 8 | DE-B | KMC | CALL ACCEPT |
| 9 | KMC | DE-A | DATA PACKET (STOP) |
| 10 | DE-A | DTE-A | LAYER 3 RNR |
| 11 | KMC | DE-A | DATA PACKET (MAC REQUEST) |
| 12 | DE-A | DTE-A | INTERRUPT |
| 13 | DTE-A | DE-A | INTERRUPT CONFIRMATION |
| 14 | DE-A | KMC | DATA PACKET (LAST MAC, KSM) |
| 15 | KMC | DE-B | DATA PACKET (LAST MAC, KSM) |
| 16 | DE-B | DTE-B | LAYER 3 RNR |
| 17 | KMC | DE-B | DATA PACKET (MAC REQUEST) |
| 18 | DE-B | DTE-B | INTERRUPT |
| 19 | DTE-B | DE-B | INTERRUPT CONFIRMATION |
| 20 | DE-B | KMC | DATA PACKET (LAST MAC, RSM) |
| 21 | KMC | DE-A | DATA PACKET (LAST MAC, RSM) |
| 22 | DE-A | DTE-A | INTERRUPT |
| 23 | DTE-A | DE-A | INTERRUPT CONFIRMATION |
| 24 | DE-A | KMC | DATA PACKET (CLOSURE) |
| 25 | KMC | DE-A | DATA PACKET (START) |

TABLE 2-continued

| | PERMANENT VIRTUAL CIRCUIT | | |
|---|---|---|---|
| STEP | FROM | TO | MESSAGE |
| 26 | DE-A | DTE-A | LAYER 3 RR |
| 27 | KMC | DE-B | DATA PACKET (START) |
| 28 | DE-B | DTE-B | LAYER 3 RR |
| 29 | KMC | DTE-B | CLEAR REQUEST |
| 30 | DE-B | DTE-B | INTERRUPT |
| 31 | DTE-B | DE-B | INTERRUPT CONFIRATION |
| 32 | DE-B | KMC | CLEAR CONFIRMATION |
| 33 | KMC | DE-A | CLEAR REQUEST |
| 34 | DE-A | DTE-A | INTERRUPT |
| 35 | DTE-A | DE-A | INTERRUPT CONFIRMATION |
| 36 | DE-A | KMC | CLEAR CONFIRMATION |

This process begins when the KMC sends a FAST SELECT CRP to DE-A containing an X9.17 RTR in step 1. DE-A then forwards this packet as a Layer 2 INT packet to DTE-A in step 2. DTE-A then generates an INT CONFIRMATION packet at step 3 in response to step 2. This INT CONFIRMATION packet is changed to a CALL ACCEPTED packet at DE-A containing an X9.17 RSM which is destined for the KMC in step 4.

After receiving the RSM from DE-A, the KMC performs a similar sequence with DE-B and DTE-B in steps 5, 6, 7 and 8 except that a normal CALL REQ is used rather than a FAST SELECT. Next, the KMC sends a DATA packet to DE-A which in essence says stop transmitting at step 9. This is converted by DE-A to a level 3 RNR packet to the target PVC address at step 10.

The following several steps are used to identify the last packet transmitted under the old encryption keys. At step 11, the KMC sends a DATA packet to DE-A which is used to get the MAC of the last data packet transmitted on the target PVC. The call is balanced with steps 12 and 13 which are INT and INT CON to DTE-A. This last MAC and an X9.17 KSM is then sent to the KMC in step 14. The KMC then sends DE-A's last MAC and an X9.17 KSM to DE-B via a DATA packet in step 15. DE-B then extracts this information and uses this data packet to generate a Layer 3 RNR packet to the target PVC address in step 16. The KMC then generates a DATA packet to DE-B requesting DE-B's last MAC at step 17. INT and INT CON messages are then used at steps 18 and 19 to balance the call. DE-B returns its last MAC and an X9.17 RSM in step 20.

The KMC then sends DE-A a DATA packet containing DE-B's last MAC and an X9.17 RSM in step 21. In steps 22 and 23, INT and INT CON messages are exchanged to balance the traffic as before. DE-A then uses this DATA packet to generate an operation closure for the key exchanged in step 24. The KMC then sends DATA packets to both DE-A and DE-B which are used to start-up message flow on the target PVC between DTE-A and DTE-B in steps 25 and 27. In steps 26 and 28 the data traffic is turned back on with a Layer 3 RR.

Lastly, the KMC sends CLEAR REQUEST packets to both DE-A and DE-B which closes all outstanding SVC's between the KMC and the associated data encrypters in steps 29 and 33. The counters are balanced with INT and INT CON at steps 30, 31 and 34, 35. Finally in steps 32 and 36 the CLEAR CON messages complete the call teardown sequences.

Figure 4:
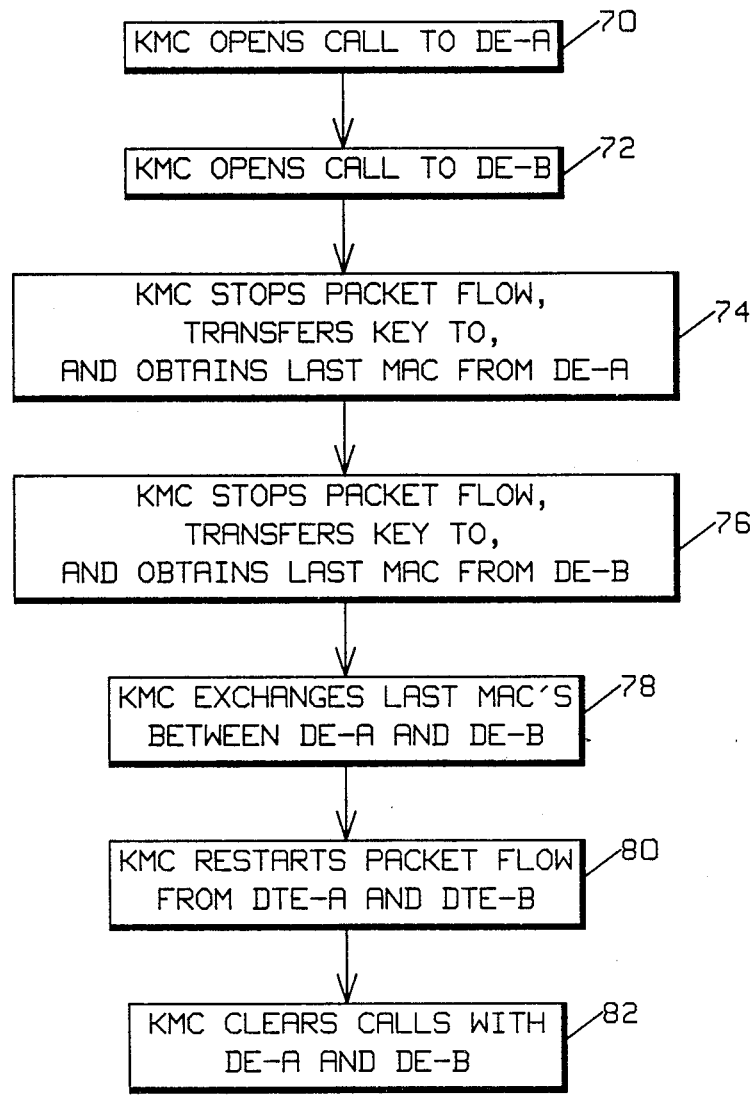
FIG. 4 shows a flow chart of the present invention's operation in a permanent virtual circuit.

Turning now to FIG. 4, the basic operation of the PVC version is described in flow chart form. In each step, INT and INT CON packets are exchanged between the DE's and the DTE's in order to accomplish message and counter balance so that the KMC may communicate directly with the DE's. A total of seven such exchanges occur in the preferred embodiment as shown in TABLE 2. Of course, the description of FIG. 4 as well as the figure itself is somewhat abbreviated and reference should be made to TABLE 2 for a more detailed step-by-step description.

At step 70, the KMC initiates a key change by calling DE-A using a FAST SELECT call. The KMC similarly initiates a call with DE-B using a standard call request at step 72. At step 74, the KMC sends messages to DE-A which stops packet flow from DTE-A, exchanges a new key and obtains the last MAC from DE-A for use in identifying the last packet transmitted by DE-A using the old key. At step 76, similar operations to those of step 74 are carried out with DE-B. At step 78, the last MAC information is exchanged so that DE-A has DE-B's last MAC and vice versa. At 80, the KMC restarts packet flow from DTE-A and DTE-B. Finally, the KMC clears calls with DE-A and DE-B at step 82.

Figure 5:
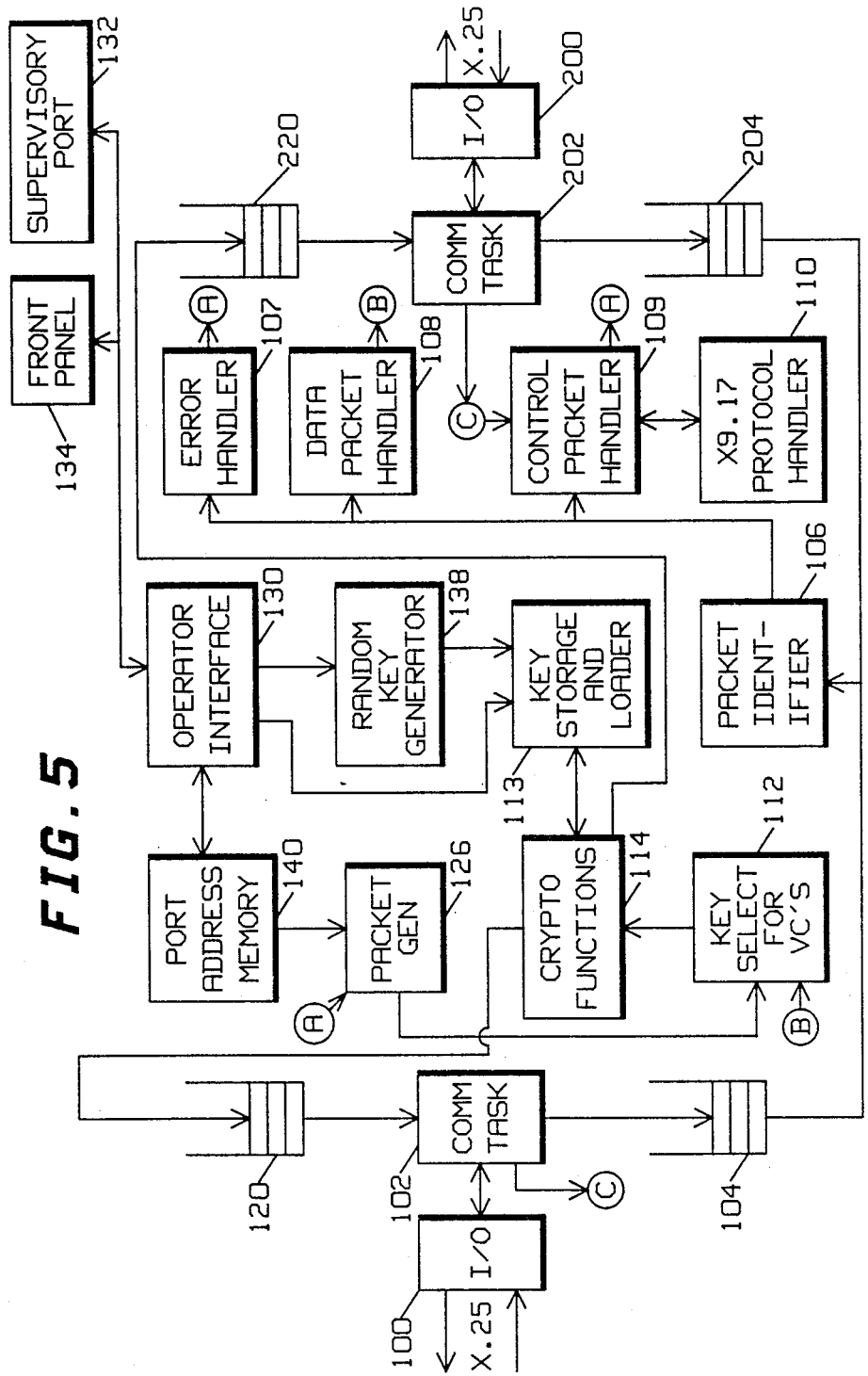
FIG. 5 shows a block diagram of one embodiment of an encryption/decryption device using the present invention.

Turning now to FIG. 5, which shows an architectural diagram, the operation of the device can be described. Starting with the inbound X.25 information, I/O logic 100 strips off the framing bits, destuffs the remaining bits and passes the results to the communications task 102. There the information will be placed into an inbound queue 104. The queue contains enough bits to enable the packet type and destination to be identified. The inbound queue is serviced by the packet identifier 106 and the information is sent to either an error handler 107, a data packet handler 108, a control packet handler 109 or an X9.17 protocol handler 110 depending on the packet type.

Data packets are parsed for the virtual circuit number which is used by the key select logic 112 to index a table of active cryptographic keys 113. Then the appropriate crypto function 114 is chosen, i.e., decrypt, encrypt, or the null operation in the case of cleartext virtual circuits. The key is retrieved from storage along with the IV field belonging to that VC. Forty eight bits, from the cryptographic residue left over after a crypto operation is performed on a given packet, are used as the starting IV for the next packet of the VC. The crypto operation is performed and the data is then placed into an outbound queue 120 or 220 for processing by the communication task 102 or 202. Two thresholds are established for the outbound queues, a min and a max for hysteresis purposes, and the queue sizes are monitored against the thresholds by the communication task. Due to the action of the DE the number of bits on the output may be more or less than on the input. The queue thresholds are used to indicate when to speed up or slow down the transmit and receive clocks on the DTE X.25 link to compensate for this difference. The I/O device 100 or 200 then performs the inverse of the operations that were performed on the inbound side, e.g. bit stuffing, framing and transmitting.

Control packets are examined to determine if they are the key management type. Regular control packets are treated in the same manner as cleartext data and are merely queued to be forwarded out the opposite X.25 port, destined to the DTE or DCE. Key management packets are first sent to the X9.17 protocol handler 110 where they are expanded and then parsed for the id and key fields. The id and keying information and packet type are used to generate a response message to be sent back to the key management center. First they are used to generate a message to the DTE which causes the DTE to generate a return packet that allows the DE to send the response message to the KMC. The new X9.17 fields are concatenated into a message and forwarded to the packet generator 126 where the source and destination addresses and virtual circuit numbers are added and an outbound control packet is formed. Key selecting, crypto functions and queuing and transmitting are then done as in the case of data packets.

CRC errors are handled by the standard X.25 Layer 2 protocol. The present solution requires that whenever a packet is received with a CRC failure, then the corresponding packet that is transmitted will be configured with an invalid CRC. This will allow the DTE or DCE to request a retransmission. Packets that are logically in error will be forwarded to the error handler 107 where a response message will be assembled and sent to the packet generator 126 which queues a response packet to be sent to the originating device.

The operator interface logic 130 performs the functions of monitoring the state of the physical locks and the supervisory port 132, accepting and setting initialization parameters, password verification, and setting device status indicators on the front panel 134. A random key generator 138 produces new cryptographic keys upon instruction from the front panel 134 or from the above-described key exchange process. The various port addresses are stored in port address memory 140.

While the above architecture may be used to implement the present invention, this is not to be limiting since many other suitable architectures may also be used. Similarly, the present invention may be implemented in hardware, software, firmware or a combination thereof without departing from the invention.

Thus it is apparent that in accordance with the present invention an apparatus that fully satisfies the objectives, aims and advantages is set forth above. While the invention has been described in conjunction with a specific embodiment, it is evident that many alternatives, modifications and variations will become apparent to those skilled in the art in light of the foregoing description. Accordingly, it is intended that the present invention embrace all such alternatives, modifications and variations as fall within the spirit and broad scope of the appended claims.

What is claimed is:

1. A method of providing communication between a transparent device and a network service provider in a packet switched network, a transparent device being defined as a network device which is not addressable by other network devices by a network address, comprising the steps of:

transmitting a call from a source Data Terminal Equipment (DTE) destined for a target DTE;

at said transparent device, intercepting said call from said source DTE to said target DTE and transmitting a call from said transparent device to said network service provider in place of said call from said source DTE;

receiving a response from said network service provider at said transparent device; and balancing traffic through said transparent device by transmitting a dummy packet from said transparent device to said source DTE in order to make frame send and receive sequence numbers equal and packet send and receive sequence numbers equal.

2. The method of claim 1, wherein said network service provider includes a key management center and wherein said transparent device includes a data encryption device, and further comprising the step of:

transmitting a cryptographic key from said key management center to said data encryption device.

3. The method of claim 2, further comprising the step of transmitting a cryptographic key to said target DTE.

4. The method of claim 1, wherein said balancing step includes the steps of transmitting an interrupt request packet from said transparent device to said source DTE and transmitting an interrupt confirm packet from said source DTE to said transparent device.

5. The method of claim 1, wherein said balancing step includes the steps of transmitting a call request packet for a fictitious address from said transparent device to said source DTE, transmitting a clear request packet from said source DTE to said transparent device and transmitting a clear confirm packet from said transparent device to said source DTE.

6. The method of claim 1, wherein said intercepting step includes the step of intercepting a call setup packet from said source DTE destined for said target DTE and substituting a fast select packet to said network service provider in its place.

7. In a packet switched network coupled to a first Data Terminal Equipment (DTE) and a second DTE with a first and a second transparent device coupled between said first and second DTE's and said packet switched network respectively, and a network service provider coupled to said packet switched network, and wherein a transparent device being defined as a network device which is not addressable by other network devices by a network address, a method for balancing traffic through said transparent device in order to make frame send and receive sequence numbers equal and packet send and receive sequence numbers equal comprising the steps of:

transmitting a dummy packet from said first transparent device to said first DTE; and responding with a response packet from said first DTE to said transparent device.

8. The method of claim 7, wherein:

said transmitting step includes transmitting an interrupt packet; and wherein:

said responding step includes responding with an interrupt confirmation packet.

9. The method of claim 7, wherein:

said transmitting step includes transmitting a call request packet to a fictitious address; and wherein:

said responding step includes responding with a clear request packet; and further comprising the step of:

sending a clear confirmation packet from said transparent device to said first DTE.

10. In a packet switched network, method for changing keys used for encrypted switched virtual circuit communication between a first Data Terminal Equipment (DTE) and a second DTE, said first and second DTE having an associated first and second encryption device, comprising the steps of:

- issuing a call request packet from said first DTE to said second DTE;
- intercepting said call request packet at said first encryption device and substituting a call request for a key management center;
- transferring a key from said key management center to said first DTE;
- balancing counters at a link associated with said first DTE and first encryption device using a dummy packet in order to make frame send and receive sequence numbers equal and packet send and receive sequence numbers equal;
- establishing a channel between said first and second data encrypters; and
- transferring a key from said first data encrypter to said second encrypter.

11. In a packet switched network, method for changing keys used for encrypted permanent virtual circuit communication between a first Data Terminal Equipment (DTE) and a second DTE, said first and second DTE having an associated first and second encryption device, comprising the steps of:

- issuing a call request packet from a key management center to said first encryption device;
- issuing a call request packet from said key management center to said second encryption device;
- from said key management center, sending a stop packet flow message from said first DTE to said second DTE and obtaining a last MAC from said first data encryption device and transferring a new key to said first data encryption device;
- from said key management center, sending a stop packet flow message from said second DTE to said first DTE and obtaining a last MAC from said second data encryption device and transferring a new key to said first data encryption device;
- from said key management center, sending a restart packet flow message to restart packet flow between said first and second DTE; and
- balancing link counters at said first and second links by transmission of dummy packets in order to make frame send and receive sequence numbers equal and packet send and receive sequence numbers equal.

* * * * *